US009157415B1

(12) United States Patent
Seymour et al.

(10) Patent No.: US 9,157,415 B1
(45) Date of Patent: Oct. 13, 2015

(54) SYSTEM AND METHOD OF CONTROLLING AN ELECTRONIC COMPONENT OF A WIND TURBINE USING CONTINGENCY COMMUNICATIONS

(71) Applicant: General Electric Company, Schenectady, NY (US)

(72) Inventors: Robert Allen Seymour, Roanoke, VA (US); James Michael Nowak, Roanoke, VA (US); David Smith, Daleville, VA (US); Terry Michael Tackman, Salem, VA (US); Allen Michael Ritter, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 20 days.

(21) Appl. No.: 14/221,566

(22) Filed: Mar. 21, 2014

(51) Int. Cl.
  F03D 9/00 (2006.01)
  H02P 9/04 (2006.01)
  F03D 7/00 (2006.01)
  G05D 3/12 (2006.01)
  G05D 1/00 (2006.01)

(52) U.S. Cl.
  CPC . F03D 7/00 (2013.01); F03D 9/003 (2013.01)

(58) Field of Classification Search
  USPC .............. 290/44, 55; 700/286; 701/7; 702/60
  See application file for complete search history.

(56) References Cited

U.S. PATENT DOCUMENTS

| 4,371,938 | A | * | 2/1983 | Wright et al. ..................... 701/7 |
| 4,385,356 | A | * | 5/1983 | Verzella et al. ................... 701/7 |
| 4,477,876 | A | * | 10/1984 | Wright et al. ..................... 701/8 |
| 6,429,648 | B1 | * | 8/2002 | Nishimura ............... 324/207.25 |
| 6,925,385 | B2 | * | 8/2005 | Ghosh et al. ..................... 702/14 |
| 7,099,800 | B2 | * | 8/2006 | Henriksen et al. ............ 702/187 |
| 7,423,412 | B2 | * | 9/2008 | Weng et al. ..................... 322/20 |
| 7,525,209 | B2 | * | 4/2009 | Kabatzke et al. ............... 290/44 |
| 7,544,149 | B2 | * | 6/2009 | Ayabe et al. ................... 477/110 |
| 7,798,938 | B2 | * | 9/2010 | Matsubara et al. ................ 477/3 |
| 7,804,184 | B2 | * | 9/2010 | Yuan et al. ....................... 290/44 |
| 7,826,988 | B2 | * | 11/2010 | Jurkat et al. ..................... 702/60 |
| 7,908,035 | B2 | * | 3/2011 | Kumar et al. .................. 700/286 |
| 8,024,492 | B2 | * | 9/2011 | Syed et al. ......................... 710/9 |
| 8,108,080 | B2 | * | 1/2012 | Wakata et al. ................ 700/286 |
| 8,121,738 | B2 | * | 2/2012 | Teichmann et al. ........... 700/287 |
| 8,155,923 | B2 | * | 4/2012 | Mengane et al. ............. 702/182 |
| 8,162,788 | B2 | * | 4/2012 | Hatch et al. ..................... 475/62 |
| 8,169,097 | B2 | * | 5/2012 | Weitkamp ....................... 290/44 |
| 8,180,498 | B2 | * | 5/2012 | Zhu et al. ...................... 700/287 |
| 8,243,278 | B2 | * | 8/2012 | Valois ........................... 356/448 |

(Continued)

Primary Examiner — Pedro J Cuevas
(74) Attorney, Agent, or Firm — Dority & Manning, P.A.

(57) ABSTRACT

The present subject matter is directed to a system and method for controlling an electrical component, e.g. a power bridge, of a wind turbine using contingency communications. In one embodiment, the method includes receiving, by the electrical component, a standard set of commands for a first time frame. A next step includes receiving, by the electrical component, one or more contingency sets of commands for time frames beyond the first time frame. The method also includes determining if the standard set of commands is received within a start window of the first time frame. A further step includes implementing, by the electrical component, the standard set of commands during the first time frame if the standard set of commands is received within the start window. The method also includes implementing, by the electrical component, one of the contingency sets of commands received during a previous time frame if the standard set of commands is not received within the start window.

20 Claims, 5 Drawing Sheets

(56) References Cited

U.S. PATENT DOCUMENTS

| | | | |
|---|---|---|---|
| 8,264,172 B2* | 9/2012 | Valois et al. | 315/312 |
| 8,295,987 B2* | 10/2012 | Gadre et al. | 700/286 |
| 8,355,823 B2* | 1/2013 | Zhang et al. | 700/286 |
| 8,467,205 B2 | 6/2013 | Petter | |
| RE44,464 E* | 8/2013 | Jurkat et al. | 702/60 |
| 8,538,593 B2* | 9/2013 | Sun et al. | 700/286 |
| 8,606,686 B1* | 12/2013 | Ippolito et al. | 705/37 |
| 8,611,107 B2 | 12/2013 | Chapman et al. | |
| 8,624,561 B1 | 1/2014 | Slavin | |
| 8,660,706 B2* | 2/2014 | Szemkus | 700/287 |
| 8,761,948 B1* | 6/2014 | Ippolito et al. | 700/286 |
| 8,977,403 B2* | 3/2015 | Ichinose | 700/287 |
| 9,035,479 B1* | 5/2015 | Gates | 290/43 |
| 2002/0029097 A1* | 3/2002 | Pionzio et al. | 700/286 |
| 2003/0102675 A1* | 6/2003 | Noethlichs | 290/44 |
| 2004/0230377 A1* | 11/2004 | Ghosh et al. | 702/3 |
| 2005/0213967 A1* | 9/2005 | Okano et al. | 398/30 |
| 2007/0026996 A1* | 2/2007 | Ayabe et al. | 477/107 |
| 2007/0177314 A1* | 8/2007 | Weng et al. | 361/20 |
| 2007/0194574 A1* | 8/2007 | Kabatzke et al. | 290/44 |
| 2009/0137361 A1* | 5/2009 | Matsubara et al. | 477/3 |
| 2009/0284184 A1* | 11/2009 | Valois et al. | 315/312 |
| 2009/0284747 A1* | 11/2009 | Valois | 356/448 |
| 2010/0049486 A1* | 2/2010 | Xu et al. | 703/6 |
| 2010/0084992 A1* | 4/2010 | Valois et al. | 315/291 |
| 2010/0138188 A1* | 6/2010 | Mengane et al. | 702/182 |
| 2010/0142237 A1* | 6/2010 | Yuan et al. | 363/97 |
| 2011/0144817 A1* | 6/2011 | Teichmann et al. | 700/287 |
| 2012/0041711 A1* | 2/2012 | Jacoby et al. | 702/151 |
| 2012/0199411 A1* | 8/2012 | Nonaka et al. | 180/422 |
| 2012/0249013 A1* | 10/2012 | Valois et al. | 315/291 |
| 2012/0280625 A1* | 11/2012 | Zampini et al. | 315/151 |
| 2013/0140820 A1* | 6/2013 | Tarnowski | 290/44 |
| 2013/0214534 A1* | 8/2013 | Nakamura et al. | 290/44 |
| 2013/0263928 A1* | 10/2013 | Inoue et al. | 137/11 |
| 2014/0062085 A1* | 3/2014 | Larsen et al. | 290/44 |
| 2014/0064916 A1* | 3/2014 | Huang et al. | 415/1 |
| 2015/0021912 A1* | 1/2015 | Bech | 290/44 |
| 2015/0061289 A1* | 3/2015 | Larsen et al. | 290/44 |
| 2015/0061290 A1* | 3/2015 | Larsen et al. | 290/44 |

* cited by examiner

SYSTEM AND METHOD OF CONTROLLING AN ELECTRONIC COMPONENT OF A WIND TURBINE USING CONTINGENCY COMMUNICATIONS

FIELD OF THE INVENTION

The present subject matter relates generally to wind turbines and, more particularly, to a system and method of controlling an electronic component of a wind turbine using contingency communications.

BACKGROUND OF THE INVENTION

Wind power is considered one of the cleanest, most environmentally friendly energy sources presently available, and wind turbines have gained increased attention in this regard. A modern wind turbine typically includes a tower, a nacelle, one or more rotor blades, a gearbox, a generator, and a power converter. The rotor blades capture and transmit kinetic energy in the form of rotational energy so as to turn a shaft coupling the rotor blades to a gearbox, or if a gearbox is not used, directly to the generator. The gearbox steps up the inherently low rotational speed of the rotor for the generator to efficiently convert the rotational mechanical energy to electrical energy, which is fed into a utility grid via at least one electrical connection. A power converter or bridge is typically used to convert a frequency of a generated electric power to a frequency substantially similar to a utility grid frequency. Conventional wind turbines also typically include a main controller to control various operational modes of the wind turbine.

Various wind turbines also include a converter controller configured to control the power converter. More specifically, the converter controller may be communicatively coupled to the power converter via a bridge logic interface. The bridge logic is a programmable logic device that generally refers to the quasi-intelligent Field-Programmable Gate Array (FPGA). In other words, the bridge logic is the program that is carried in the controller code and downloaded to the power bridge interface card at power-up of the wind turbine. In addition, the bridge logic typically interfaces with the converter controller over a serial link, e.g. a High-Speed Serial Link (HSSL), and the power bridge via discrete signals.

Typically, the communications between the controller and the bridge logic occurs periodically at regular intervals, generally referred to as a "frame." For example, feedback communications are sent from the bridge logic to the controller at the beginning of each frame, and upon receipt of the feedback communications, the controller performs calculations that result in new command communications for the bridge logic for the next frame. The controller then sends the new command communications to the bridge logic before the start of the next frame. Upon receipt, the bridge logic uses information in the new command communications to configure the gating and feedback logic for the next frame.

Due to the number of asynchronous processes running in the controller, however, the bridge logic may not receive the new command communications in a timely fashion. Further, noise in the transmission of the new command communications and/or the feedback communications may delay the communications from being transmitted or received on time. Thus, the gating and feedback logic for the next frame may not be configured properly. For these and other reasons, the bridge logic may experience a resulting disturbance to its gating/command operations and fail to acquire and transmit feedback communications to the controller. Still further electrical components of the wind turbine may experience similar issues when communicating with the controller.

Accordingly, a system and method that addresses the aforementioned problems would be welcomed in the technology. More specifically, a system and method that incorporates contingency communications for the upcoming gating frame and one or more subsequent frames would be advantageous.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling an electrical component of a wind turbine. The method includes receiving, by the electrical component, a standard set of commands for a first time frame. A next step includes receiving, by the electrical component, one or more contingency sets of commands for time frames beyond the first time frame. The method also includes determining if the standard set of commands is received within a start window of the first time frame. A further step includes implementing, by the electrical component, the standard set of commands during the first time frame if the standard set of commands is received within the start window. The method also includes implementing, by the electrical component, one of the contingency sets of commands received during a previous time frame if the standard set of commands is not received within the start window.

In one embodiment, the method further includes detecting whether the electrical component is controlled based on the standard set of commands or the contingency set of commands and sending the detection to the controller. In further embodiments, the method includes overwriting the contingency set of commands received during a previous time frame if the standard set of commands is received within the start window of the first time frame. In additional embodiments, if the electrical component is controlled based on the contingency set of commands, the method may include determining an error between the contingency set of commands and the standard set of commands and adjusting subsequent commands based on the error.

In various embodiments, the contingency set of commands may be calculated utilizing one or more algorithms. For example, in several embodiments, the one or more algorithms may include one of or a combination of the following: a hold-last value, a stop value, a time/angle-based extrapolation, a zero-order hold value, higher-order extrapolation, a melding technique, and/or similar.

In another aspect, the present subject matter is direction to a method for controlling an electrical component of a wind turbine. The method includes receiving, via the controller, feedback communications from the electrical component; determining if the feedback communications are received within a start window of a first time frame; calculating, via the controller, a set of commands for the first time frame, wherein if the feedback communications are received within the start window of the first time frame, the calculations are based on the feedback communications, and wherein if the feedback communications are not received within the start window of the first time frame, the calculations are based on an estimated feedback value; and, controlling the electrical component based on the set of commands applied during the first time frame.

In one embodiment, the set of commands may include a standard set of commands and a contingency set of commands. Thus, in a further embodiment, the method may further include controlling the electrical component based on one of the standard set of commands or the contingency set of commands. In addition, the method may include detecting whether the electrical component is controlled based on the standard set of commands or the contingency set of commands. In yet another embodiment, the method may include determining an error between the contingency set of commands and the standard set of commands and adjusting subsequent commands based on the error. In still a further embodiment, the method may further include adjusting subsequent calculated commands based on the error. Further, in additional embodiments, the method may also include overwriting the contingency set of commands when the feedback communications are received within a required start window of the first time frame.

In several embodiments, the contingency set of commands may be calculated utilizing one or more algorithms. For example, in various embodiments, the one or more algorithms may include one of or a combination of the following: a hold-last value, a stop value, a time/angle-based extrapolation, a zero-order hold value, higher-order extrapolation, a melding technique, or similar. In various embodiments, the standard set of commands may be determined based on the received feedback communications.

In yet another aspect, the present subject matter is directed to a system for controlling an electrical component of a wind turbine. The system includes a controller communicatively coupled to one or more processors. The controller is configured to: receive feedback communications from the electrical component; determine if the feedback communications are received within a start window of a first time frame; calculate a set of commands for the first time frame, wherein if the feedback communications are received within the start window of the first time frame, the calculations are based on the feedback communications, and wherein if the feedback communications are not received within the start window of the first time frame, the calculations are based on an estimated feedback value; and, control the electrical component based on the set of commands during the second time frame.

In various embodiments, the controller and the electrical component are communicatively coupled via a serial link.

It should be understood that the electrical component as described herein may be any suitable electrical component of the wind turbine, including, but not limited to a power converter, a bridge logic interface, a bridge rectifier, a power semiconductor device, and/or an insulated-gate bipolar transistor (IGBT).

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
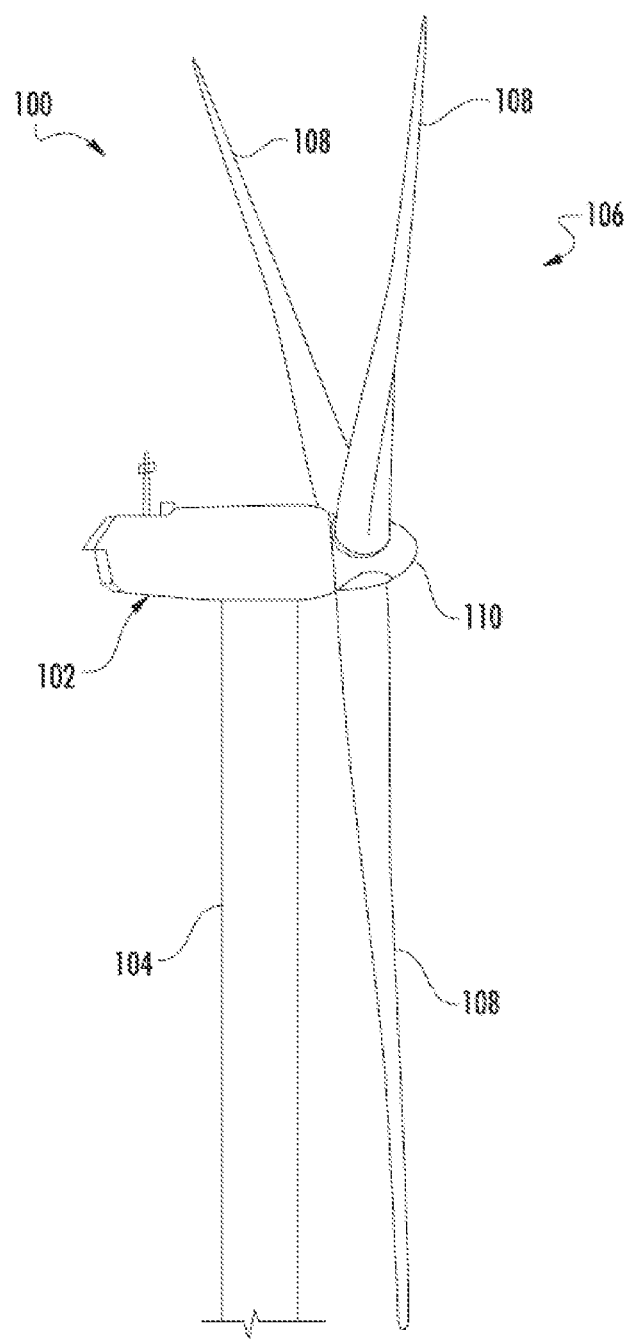
FIG. 1 illustrates a perspective view of a portion of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a system and method for controlling an electrical component, e.g. a power bridge, of a wind turbine using contingency communications. As mentioned, in one embodiment, the electrical component corresponds to a bridge logic interface of the power converter. The electrical component is configured to receive a standard set of commands for a first time frame. In addition, the electrical component receives one or more contingency sets of commands for time frames beyond the first time frame. The electrical component is also configured to determine if the standard set of commands is received within a start window of the first time frame. If the standard set of commands is received on time, the electrical component implements the standard set of commands during the first time frame. In contrast, if the standard set of commands are not received on time, the electrical component implements one of the contingency sets of commands received during a previous time frame.

The present subject matter has many advantages not present in the prior art. For example, if conventional systems failed to receive commands and/or feedback communications in a timely fashion, then the gating and feedback logic for the next frame would not be configured properly, resulting in a disturbance in the gating operation of the power bridge and/or a failure to acquire and transmit the feedback to the controller. The present disclosure, however, determines contingency information for subsequent time frames beyond simply that of the next time frame such that the contingency information can be utilized in the event that feedback data and/or commands are not received in time. Thus, the system and method of the present disclosure provides tolerance for late or degraded communications between the wind turbine controller and one or more electrical components of the wind turbine and thereby eliminates and/or reduces corresponding faults and/or system failures. Further, the present disclosure provides robust and reliable operation of the electrical equipment in the presence of intermittent communication problems.

Referring now to the drawings, FIG. 1 is a perspective view of a portion of an exemplary wind turbine 100 according to the present disclosure. The wind turbine 100 includes a nacelle 102 that typically houses a generator (not shown). The nacelle 102 is mounted on a tower 104 having any suitable height that facilitates operation of the wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Figure 2:
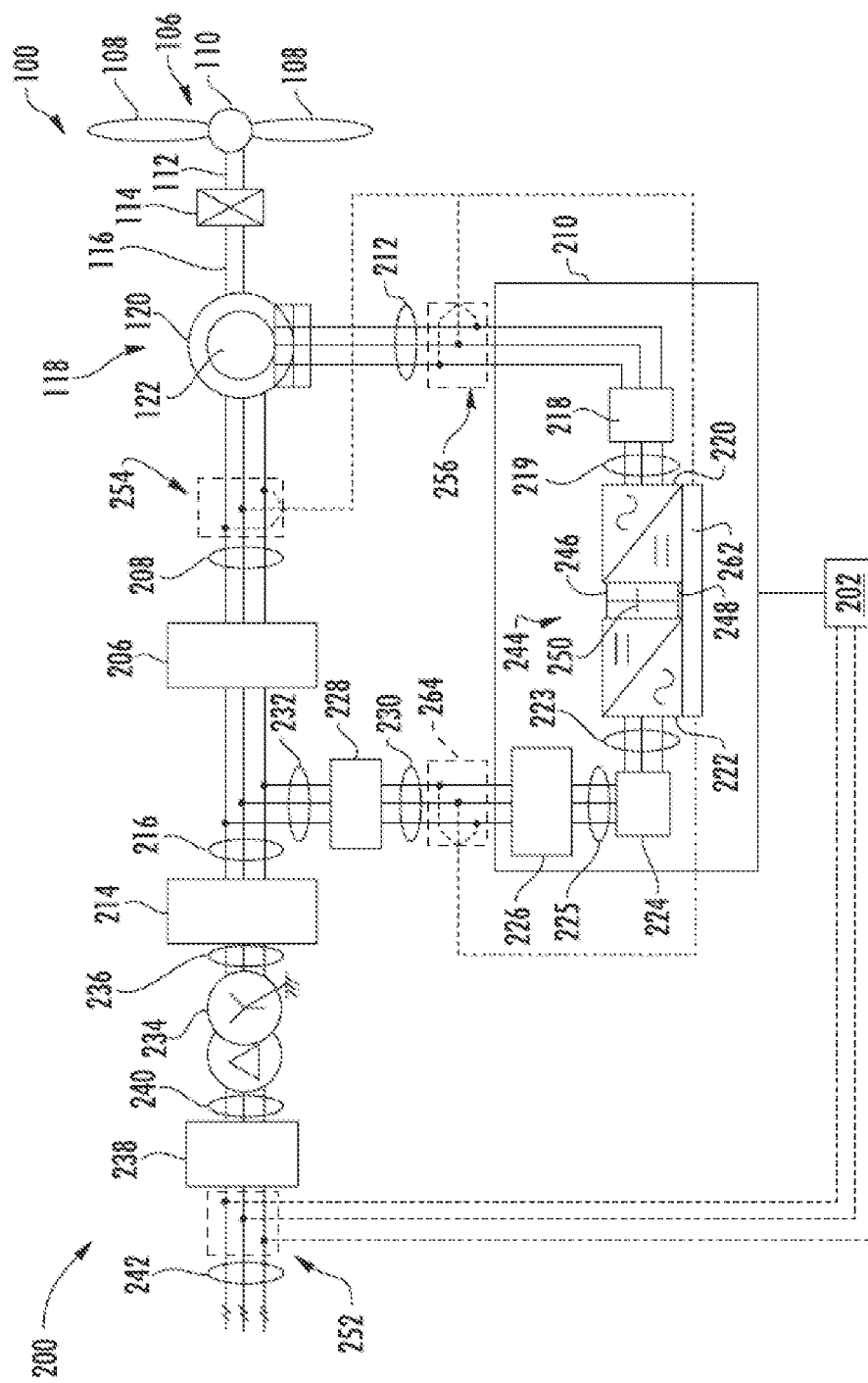
FIG. 2 illustrates a schematic view of one embodiment of an electrical and control system suitable for use with the wind turbine shown in FIG. 1.

Referring to FIG. 2, a schematic view of an exemplary electrical and control system 200 that may be used with the wind turbine 100 is illustrated. During operation, wind impacts the blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122. In one embodiment, the generator 118 may be a wound rotor, three-phase, double-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In one embodiment, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a breaker-side bus 240, a grid circuit breaker 238, and a grid bus 242.

Figure 3:
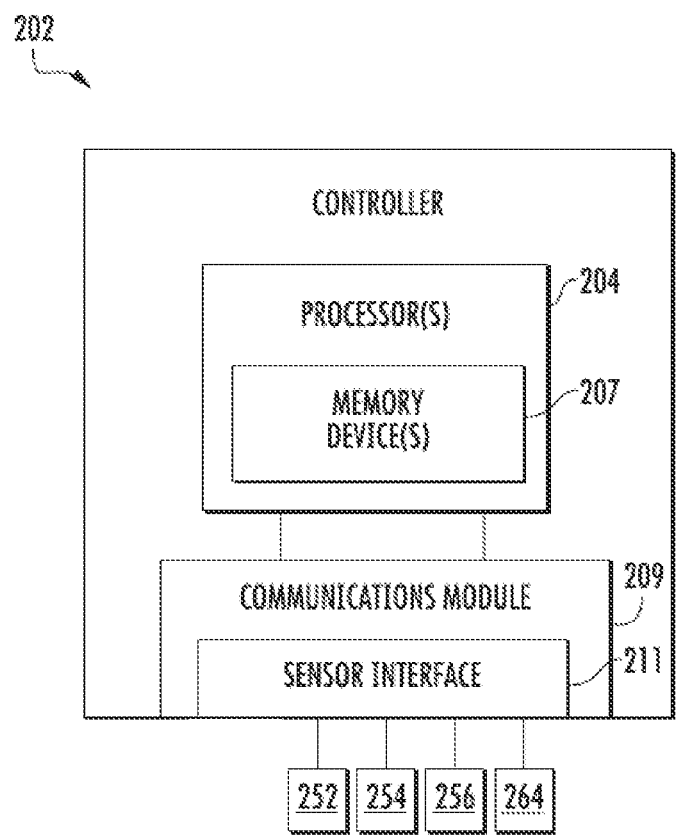
FIG. 3 illustrates a block diagram of one embodiment of a controller suitable for use with the wind turbine shown in FIG. 1.

In addition, the electrical and control system 200 may include a wind turbine controller 202 configured to control any of the components of the wind turbine 100. For example, as shown particularly in FIG. 3, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 2. Further, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 264) may be communicatively coupled to the communications module 209 using any suitable means. For example, as shown in FIG. 3, the sensors 252, 254, 256, 264 are coupled to the sensor interface 211 via a wired connection. However, in other embodiments, the sensors 252, 254, 256, 264 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 2, the generator stator 120 may be electrically coupled to a stator synchronizing switch 206 via a stator bus 208. In one embodiment, to facilitate the DFIG configuration, the generator rotor 122 is electrically coupled to a bi-directional power conversion assembly 210 via a rotor bus 212. Alternatively, the generator rotor 122 may be electrically coupled to the rotor bus 212 via any other device that facilitates operation of electrical and control system 200 as described herein. In a further embodiment, the stator synchronizing switch 206 may be electrically coupled to a main transformer circuit breaker 214 via a system bus 216.

The power conversion assembly 210 may include a rotor filter 218 that is electrically coupled to the generator rotor 122 via the rotor bus 212. A rotor filter bus 219 electrically couples the rotor filter 218 to a rotor-side power converter 220. Further, the rotor-side power converter 220 may be electrically coupled to a line-side power converter 222. It should be understood that the rotor-side converter 220 and the line-side converter 222 may be any suitable type of converter. For example, the converters 220, 222 as described herein may be any one of or combination of the following: an AC-DC converter, an AC-AC converter, a DC-DC converter, a DC-AC converter, a bridge rectifier, a power semiconductor device, an insulated-gate bipolar transistor (IGBT), or similar. The IGBT is generally a three-terminal power semiconductor device that is primarily used as an electronic switch. The rotor-side power converter 220 and the line-side power converter 222 may have any configuration using any switching devices that facilitate operation of electrical and control system 200 as described herein. Further, the power conversion assembly 210 may be coupled in electronic data communication with the turbine controller 202 and/or a separate or integral converter controller 262 to control the operation of the rotor-side power converter 220 and the line-side power converter 222, which will be discussed in more detail below.

Still referring to FIG. 2, a line-side power converter bus 223 may electrically couple the line-side power converter 222 to a line filter 224. Also, a line bus 225 may electrically couple the line filter 224 to a line contactor 226. Moreover, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

Within the power conversion assembly 210, the rotor-side power converter 220 may be electrically coupled with the line-side power converter 222 via a single direct current (DC) link 244. Alternatively, the rotor-side power converter 220 and the line-side power converter 222 may be electrically coupled via individual and separate DC links. In addition, as shown, the DC link 244 may include a positive rail 246, a negative rail 248, and at least one capacitor 250 coupled therebetween.

During operation, the controller 202 may be configured to receive one or more voltage and/or electric current measurement signals from a first set of voltage and electric current sensors 252. Thus, the controller 202 may be configured to monitor and control at least some of the operational variables associated with the wind turbine 100 via the sensors 252. In the illustrated embodiment, each of the sensors 252 may be electrically coupled to each one of the three phases of grid bus 242. Alternatively, the sensors 252 may be electrically coupled to any portion of electrical and control system 200 that facilitates operation of electrical and control system 200 as described herein. In addition, the sensors as described herein may be configured to measure and/or monitor one or more operating parameters of wind turbine 100. In one embodiment, for example, the sensors may include the first set of voltage and electric current sensors 252, a second set of voltage and electric current sensors 254, a third set of voltage and electric current sensors 256, a fourth set of voltage and electric current sensors 264 (all shown in FIG. 2), and/or any other suitable sensors.

It should also be understood that any number or type of sensors may be employed within the wind turbine 100 and at any location. For example, the sensors may be a Micro Inertial Measurement Units (MIMUs), strain gauges, accelerometers, pressure sensors, temperature sensors, angle of attack sensors, vibration sensors, Light Detecting and Ranging (LIDAR) sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors. Further, the sensors and/or devices may be part of the same wind farm, from different wind farms, or independent of any wind farm.

As mentioned, the system 200 may also include a converter controller 262 configured to receive one or more voltage and electric current measurement signals. For example, as shown in the illustrated embodiment, the converter controller 262 receives voltage and electric current measurement signals from the second set of voltage and electric current sensors 254 coupled in electronic data communication with stator bus 208. The converter controller 262 may also receive the third and fourth set of voltage and electric current measurement signals from the third and fourth set of voltage and electric current sensors 256, 264. In addition, the converter controller 262 may be configured with any of the features described herein in regards to the main controller 202. Further, the converter controller 262 may be separate from or integral with the main controller 202.

Figure 4:
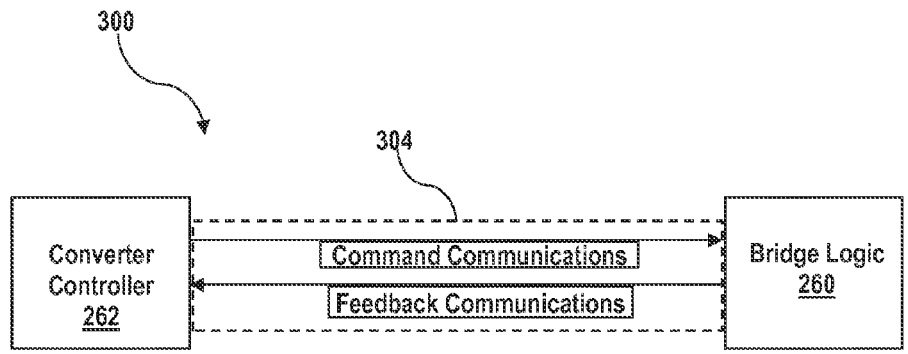
FIG. 4 illustrates a schematic diagram of one embodiment of a system for controlling a wind turbine according to the present disclosure.
Figure 5:
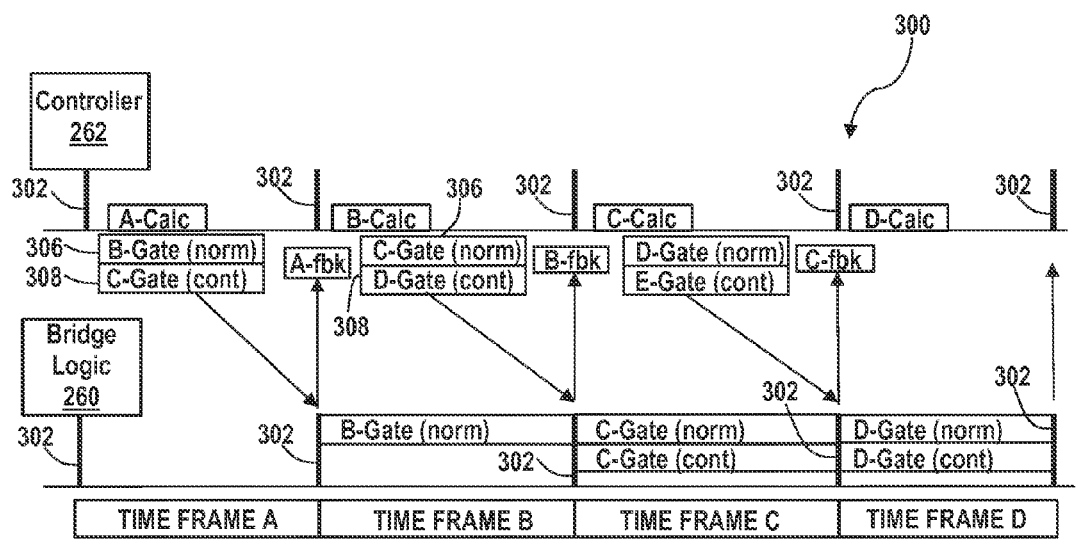
FIG. 5 illustrates a schematic diagram of one embodiment of the converter controller communicating with the bridge logic according to the present disclosure; and, FIG. 6 illustrates one embodiment of a method according to the present disclosure.
Figure 6:
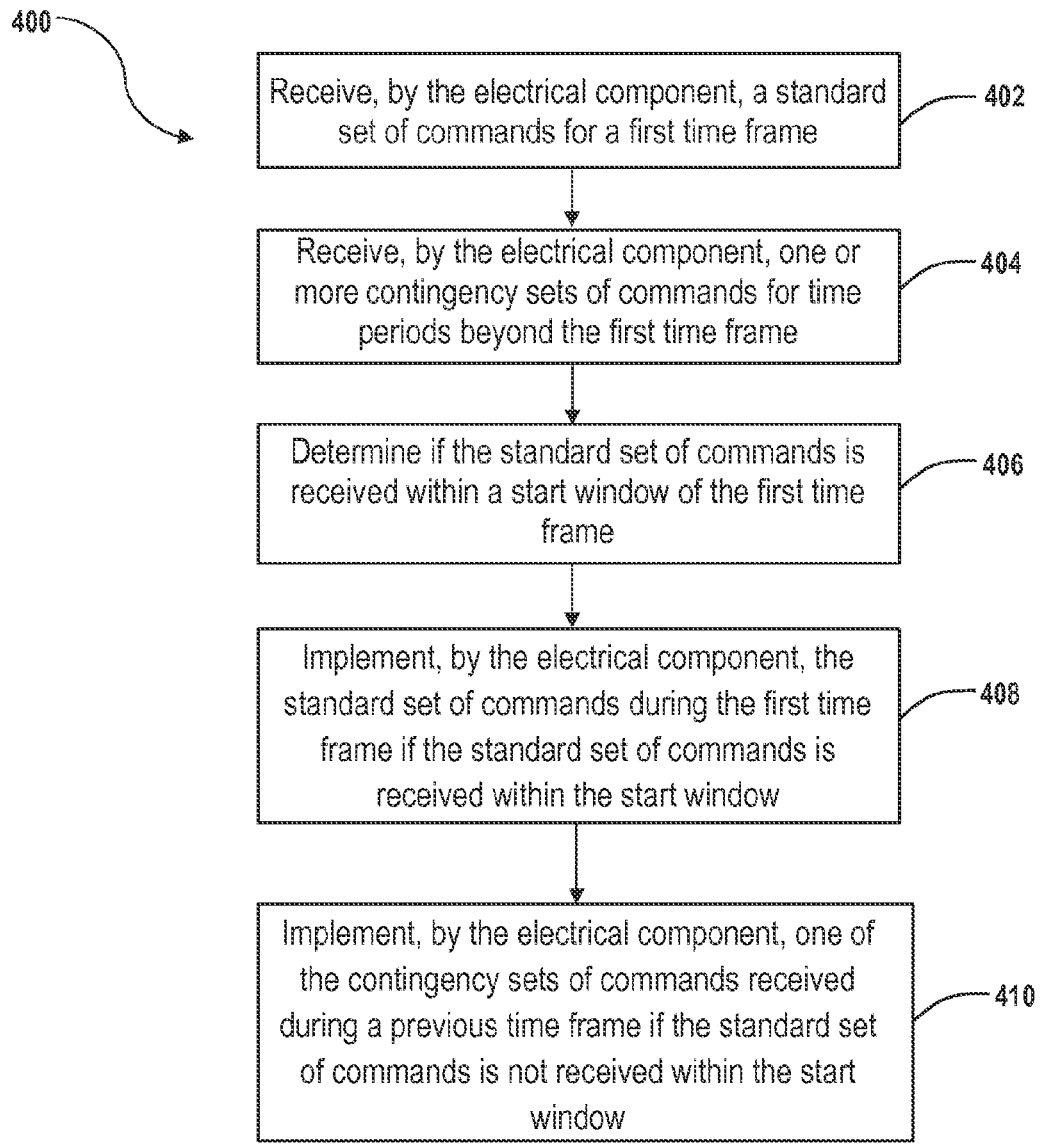

Referring now to FIGS. 4-6, various embodiments of a system 300 and method 400 for controlling the wind turbine 100 according to the present disclosure are illustrated. Referring particularly to FIG. 4, the system 300 typically includes a converter controller 262 communicatively coupled to an electrical component. For example, as shown in the illustrated embodiment, the electrical component corresponds to the bridge logic interface 260. It should be understood that the electrical component may include any suitable electrical and/or power component of the wind turbine 100, including, but not limited to, a power converter (including an AC-DC converter, an AC-AC converter, a DC-DC converter, a DC-AC converter, or similar), a bridge rectifier, a power semiconductor device, an insulated-gate bipolar transistor (IGBT), or similar. Further, the converter controller 262 and the bridge logic 260 communicate with each other over a communication link 304. More specifically, as shown, the communication link corresponds to a serial link 304. As used herein, a serial link generally refers to a link having the ability to communicate by sending data one bit at a time, sequentially, over a communication channel or computer bus. For example, in various embodiments, the serial link 304 may be a High-Speed Serial Link (HSSL). In further embodiments, the communication link 304 may include any other suitable communication channel known in the art.

Referring to FIGS. 4 and 5, the bridge logic interface 260 continuously generates feedback communications (represented in FIG. 5 as A-fbk, B-fbk, C-fbk) that are affected by commands received from the converter controller 262 and various other factors. In various embodiments, the feedback communications may include any information regarding the operational status of the electrical component, e.g. voltages, currents, state information, commands, fault status, temperature, etc. Similarly, the converter controller 262 continuously generates commands based on the feedback communications received from the bridge logic 260. In various embodiments, the commands may include information regarding single-edge or multi-edge modulations and/or bridge transitions, rotations, advancing voltages, low-to-high transitions, high-to-low transitions, progression of a phasor onto the terminals of the multi-phase system, pattern firing, notched square-wave, etc. For example, in certain embodiments, bridge transitions involve phase-by-phase transition direction (positive or negative) and the time at which the transition is to take place.

Referring particularly to FIG. 5, the communications typically occur periodically and at a regular time intervals, as indicated by Time Frames A through D. The time frames may be any suitable time period, for example from about 50 microseconds to about 200 microseconds. In still further embodiments, the time frames may be less than 50 microseconds or greater than 200 microseconds. The feedback communications (e.g. A-fbk, B-fbk, and C-fbk) are sent from the bridge logic 260 to the converter controller 262 during a start window of one of the time frames, as indicated by the bold vertical lines 302.

The present disclosure will now be explained further in reference to Time Frame B, however, it should be understood that preceding and subsequent time frames operate in a similar manner and Time Frame B is simply discussed for illustrated purposes only. For example, feedback communications, namely A-fbk, are sent from the bridge logic 260 to the controller at the start of Time Frame B, as indicated by the bold lines 302. Upon receipt of the A-fbk communications, the converter controller 262 performs calculations, depicted as B-Calc, that result in one or more commands (e.g. C-Gate (norm)) for the bridge logic 260 for the next time frame, Time Frame C. The converter controller 262 then sends the new commands to the bridge logic 260 before the start of Time Frame C. Upon reception, the bridge logic 260 uses information in the new commands to configure the gating and feedback logic (B-fbk) for Time Frame C.

The converter controller 262 is also configured to calculate one or more contingency commands for a time frame beyond the next time frame. For example, during Time Frame A, the controller 262 calculates one set of normal commands (e.g. B-Gate (norm)) for Time Frame B and one set of contingency commands (C-Gate (cont)) for Time Frame C and can continue this process for subsequent time frames. Thus, as the controller 262 and the bridge logic 260 continue to communicate over subsequent time frames, if the bridge logic 260 does not receive the normal commands (e.g. C-Gate (norm)) in a timely fashion, the gating and feedback logic for Time Frame C will be based on the contingency commands (C-Gate (cont)) that were calculated during Time Frame B. Accordingly, the system 300 reduces disturbance to the system associated with disturbance in data transmission between the bridge logic 260 and the controller 262 by providing backup commands and feedback.

In additional embodiments, if the contingency commands (e.g. C-Gate (cont)) are not utilized by the bridge logic 260 during a certain time frame (e.g. because the bridge logic 260 receives the C-Gate (norm) commands in a timely fashion), then the contingency commands may be overwritten by the normal commands contained that are received in a timely fashion. Alternatively, in the case that the normal commands are not received by the bridge logic 260 in a timely manner, then the bridge logic 260 is configured to employ the contingency commands, e.g. C-Gate (cont), from the last timely set of commands received by the bridge logic 260 (e.g. the contingency commands received at the start of Time Frame A). If the contingency commands are utilized, then the controller 262 is configured to detect that the utilized command was a contingency. Thus, the controller 262 has a more accurate model of what ideally should have been commanded, and calculates an error to incorporate into subsequent commands. The error can be used to compensate subsequent commands and mitigate the effect of the contingency. As such, the controller 202 does not have to wait to sense and respond to the effect of command errors introduced by use of the contingency commands by way of normal feedback communications, as the controller 262 can take corrective action at much higher bandwidth and reduced latency. In several embodiments, where the contingency commands have been used, the error from the desired non-contingency commands can be anticipated. In such an embodiment, a response resulting from this error can be reduced by actions of the controller 262 that form the standard commands. Since the error(s) can be anticipated, the next computed standard commands can make necessary adjustments in response to the known error. Accordingly, the contingency commands allow the bridge gating and acquisition and transmission of the feedback communications to continue to operate with minimal disturbance.

Still referring to Time Frame B, in conventional systems, if the converter controller 262 failed to receive the new feedback communications (e.g. A-fbk) in a timely fashion, the converter controller 262 calculations (e.g. B-Calc) would not have valid data to work with, thereby causing a corresponding disturbance to the bridge commands (e.g. C-Gate (norm)). To address this problem, the converter controller 262 of the present disclosure detects that the feedbacks communications (e.g. A-fbk) were not received in time and estimates the feedback communications, e.g. determines an estimated feedback value, to use in the converter controller 262 calculations. Thus, if the converter controller 262 fails to receive the A-fbk communications, the controller 262 can continue to operate properly by estimating the missed feedback communications and calculating the standard set of commands 306 and the contingency set of commands 308 based on estimated feedback and sending the standard and contingency sets of commands 306, 308 to the bridge logic 260 such that the bridge logic 260 will continuously receive commands from the converter controller 262. Thus, the communications between the converter controller 262 and the bridge logic 260 will continue to operate with minimal disturbance.

It should be understood that various algorithms may be utilized to estimate the feedback communications. For example, in one embodiment, the controller 262 may determine a hold-last value. More specifically, and referring to Time Frame C of FIG. 5, if B-fbk is not received by the converter controller 262 in a timely fashion (e.g. at the start of Time Frame C), then the controller 262 may utilize the last value that was received for a feedback communication, namely A-fbk, to calculate the commands for Time Frame C. In further embodiments, the converter controller 262 may extrapolate the missed feedback communication. For example, the controller 262 may utilize one or more time/angle-based extrapolations to estimate the missed communication. In one embodiment, where the electrical component includes a multi-phase AC component, electrical quantities are rotating in a two-dimensional plane. Thus, steady-state involves a continuously-changing set of states, as opposed to a set of constant values. Accordingly, the nature of the missed communication could be an angle and/or a magnitude, and may involve any number of derivatives in time. In further embodiments, where a continuation of low dynamic states predict future phasor persistence, an expectation of the near future bridge logic 260 commands can be estimated by first predicting a frame-by-frame average desired voltage, and then computing the bridge logic 260 commands necessary to enforce them. In still additional embodiments, extrapolation can be increasingly complex, as further sophistication and/or time extensions are to be accommodated.

In still additional embodiments, the converter controller 262 may estimate the missed feedback communications using one or more melding or blending techniques. For example, in one embodiment, the missed feedback communications may be estimated by incorporating some of the command content. In certain embodiments, such content may be in the form of feed-forward estimates of responses to commands, assuming a given shape of response. In further embodiments, where the feedback communications are expected to confirm information resulting from the average voltage command, the average voltage command may be used. In still additional embodiments, where the feedback communications are expected to confirm information resulting from a contingent prior computation of the average voltage command, the prior average voltage computation may be used. In still further embodiments, the missed feedback communications may be estimated using a stop value, a zero-order hold value, higher-order extrapolation, or any other suitable calculation method. The estimation of the feedback communications allows the converter controller 262 calculations to continue to operate with minimal disturbance.

Referring now to FIG. 6, one embodiment of a method 400 for controlling a wind turbine 100 according to the present disclosure is illustrated. As shown, the method 400 may include a step 402 of receiving, by the electrical component, a standard set of commands for a first time frame. A next step 404 may include receiving, by the electrical component, one or more contingency sets of commands for time frames beyond the first time frame. The method 400 may also include a step 406 of determining if the standard set of commands is received within a start window of the first time frame. In addition, another step 408 includes implementing, by the electrical component, the standard set of commands during the first time frame if the standard set of commands is received within the start window. The method 400 may also include a step 410 of implementing, by the electrical component, one of the contingency sets of commands received during a previous time frame if the standard set of commands is not received within the start window.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an electrical component of a wind turbine, the method comprising:
   receiving, by the electrical component, a standard set of commands for a first time frame;
   receiving, by the electrical component, one or more contingency sets of commands for time frames beyond the first time frame;
   determining if the standard set of commands is received within a start window of the first time frame;
   implementing, by the electrical component, the standard set of commands during the first time frame if the standard set of commands is received within the start window; and,
   implementing, by the electrical component, one of the contingency sets of commands received during a previous time frame if the standard set of commands is not received within the start window.

2. The method of claim 1, further comprising detecting whether the electrical component is controlled based on the standard set of commands or one of the contingency sets of commands and sending the detection to the controller.

3. The method of claim 1, further comprising overwriting the contingency set of commands received during a previous time frame if the standard set of commands is received within the start window of the first time frame.

4. The method of claim 1, wherein, if the electrical component is controlled based on the contingency set of commands, the method further comprises determining, by the controller, an error between the contingency set of commands and the standard set of commands and adjusting subsequent commands based on the error.

5. The method of claim 1, wherein the contingency sets of commands is calculated utilizing one or more algorithms.

6. The method of claim 5, wherein the one or more algorithms comprise one of or a combination of the following: a hold-last value, a stop value, a time/angle-based extrapolation, a zero-order hold value, higher-order extrapolation, or a melding technique.

7. The method of claim 1, wherein the electrical component comprises any one of or a combination of the following: a power converter, a bridge logic interface, a bridge rectifier, a power semiconductor device, or an insulated-gate bipolar transistor (IGBT).

8. A method for controlling an electrical component of a wind turbine, the method comprising:
   receiving, via the controller, the feedback communications from the electrical component;
   determining if the feedback communications are received by the controller within a start window of a first time frame;
   calculating, via the controller, a set of commands for the first time frame, wherein if the feedback communications are received within the start window of the first time frame, the calculations are based on the received feedback communications, and wherein if the feedback communications are not received within the start window of the first time frame, the calculations are based on an estimated feedback value; and,
   controlling the electrical component based on the set of commands applied during the first time frame.

9. The method of claim 8, wherein the set of commands comprises a standard set of commands and a contingency set of commands.

10. The method of claim 9, further comprising controlling the electrical component based on one of the standard set of commands or the contingency set of commands.

11. The method of claim 10, further comprising detecting whether the electrical component is controlled based on the standard set of commands or the contingency set of commands.

12. The method of claim 11, further comprising determining an error between the contingency set of commands and the standard set of commands.

13. The method of claim 12, further comprising adjusting subsequent calculated commands based on the error.

14. The method of claim 8, further comprising overwriting the contingency set of commands when the feedback communications are received within the start window of the first time frame.

15. The method of claim 8, wherein the estimated feedback value is calculated utilizing one or more algorithms, wherein the one or more algorithms comprise one of or a combination of the following: a hold-last value, a stop value, a time/angle-based extrapolation, a zero-order hold value, higher-order extrapolation, or a melding technique.

16. The method of claim 8, wherein the standard set of commands is determined based on the received feedback communications.

17. The method of claim 8, wherein the electrical component comprises one of a power converter, a bridge logic interface, a bridge rectifier, a power semiconductor device, or an insulated-gate bipolar transistor (IGBT).

18. A system for controlling an electrical component of a wind turbine, the system comprising:
   a controller communicatively coupled to one or more processors, the controller configured to:
   receive feedback communications from the electrical component;
   determine if the feedback communications are received within a start window of a first time frame;
   calculate a set of commands for the first time frame, wherein if the feedback communications are received within the start window of the first time frame, the calculations are based on the feedback communications, and wherein if the feedback communications are not received within the start window of the first time frame, the calculations are based on an estimated feedback value; and,
   control the electrical component based on the set of commands during the first time frame.

19. The system of claim 18, wherein the controller and the electrical component are communicatively coupled via a serial link.

20. The method of claim 18, wherein the electrical component comprises one of a power converter, a bridge logic interface, a bridge rectifier, a power semiconductor device, or an insulated-gate bipolar transistor (IGBT).

* * * * *